Figure 1:
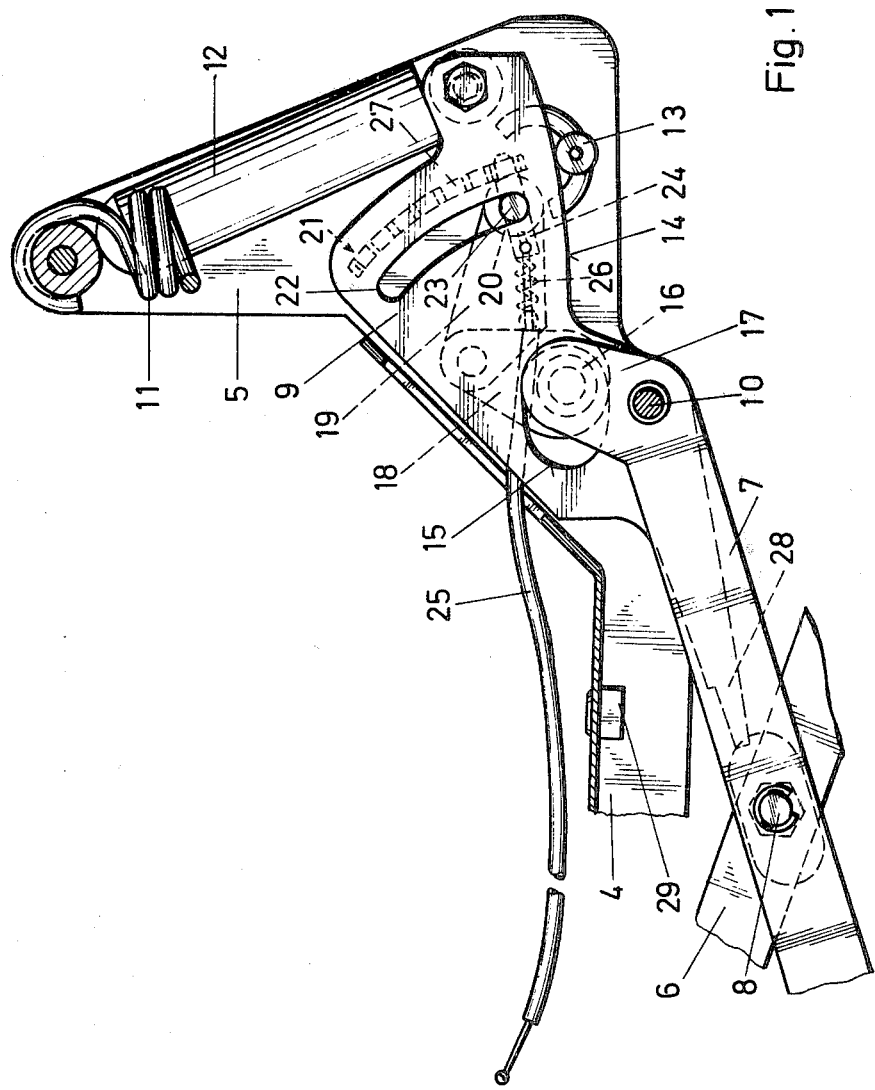

United States Patent [19]
Grass et al.

[11] 4,181,355
[45] Jan. 1, 1980

[54] VEHICLE SEAT

[75] Inventors: Gerd Grass, Detmold; Jörg Hettich, Lemgo, both of Fed. Rep. of Germany

[73] Assignee: Gebr. Isringhausen, Lemgo, Fed. Rep. of Germany

[21] Appl. No.: 874,339

[22] Filed: Feb. 1, 1978

[30] Foreign Application Priority Data

Feb. 7, 1977 [DE] Fed. Rep. of Germany ....... 2704920

[51] Int. Cl.² ............................................... A47C 3/00
[52] U.S. Cl. .................................... 297/307; 248/564
[58] Field of Search ............. 248/157, 399, 400, 421, 248/423; 297/307–309, 345; 108/117, 145

[56] References Cited
U.S. PATENT DOCUMENTS

| | | | |
|---|---|---|---|
| 3,090,647 | 5/1963 | Moore | 297/307 |
| 3,109,621 | 11/1963 | Simons et al. | 297/308 X |
| 3,761,045 | 9/1973 | Sturhan | 297/307 X |
| 3,954,298 | 5/1976 | Lowe | 248/399 X |

*Primary Examiner*—James C. Mitchell
*Attorney, Agent, or Firm*—Salter & Michaelson

[57] ABSTRACT

A resiliently-mounted vehicle seat is provided with means for adjusting its height.

The seat is of the kind having a seat frame supported from an underframe by scissors linkages. A link of each scissor linkage has an extension piece which is engaged by a spring and damping unit. The extension piece is pivotable about a pivot about which the associated link also pivots. The extension piece is releasably securable to the link through an intermediate link.

The arrangement affords an adjustment mechanism which gives fine adjustment of the height while not affecting the installation height of the seat.

3 Claims, 3 Drawing Figures

VEHICLE SEAT

This invention relates to a resiliently-mounted vehicle seat of the kind in which a seat frame, which carries a seat cushion, is supported on an underframe by scissors linkages arranged at the sides of the seat, the links of the linkage being connected together at their points of intersection by pivot pins, wherein at least one of the links is extended outwards through a rear pivot pin for the link carried on the seat frame by an extension piece on which there engages one end of a spring and damping unit comprising tension springs and a shock absorber, as described in patent application Ser. No. 874,337.

An object of the invention is to provide a vehicle seat of this kind having a device for height adjustment of the seat surface relative to the underframe which is capable of adjustment in small steps.

Devices for height adjustment which are arranged as groups of constructional components under the seat frame are known. However they have the disadvantage that even in a fully folded-up state they occupy appreciable constructional height. This is undesirable in vehicle seats particularly when installed in motor cars since seats ought to be kept free from auxiliary mechanisms under the seat frames in order to achieve as small an installation height as possible.

According to the invention a resiliently-mounted vehicle seat comprises a seat frame; a seat cushion carried by the seat frame; an underframe; a scissors linkage on each side of the underframe supporting the seat frame from the underframe; a pivot pin connecting the links of each scissors linkage at their point of intersection, at least one of the scissors linkages having an extension piece on one of its links which extends beyond a pivot by which said one link is pivotally attached to the seat frame; a supporting and damping unit including tension springs and a shock absorber, the unit engaging the extension piece which is pivotable about the pivot for said one link and is releasably securable to said one link.

The extension piece may, for example, be secured by means of a pin which is movably mounted on said one link and which engages in holes in the extension piece. In such vehicle seats the range of angle of adjustment between said one link and the extension piece provides an adjustment in the height of the seat frame relative to the floor of the vehicle and it has the advantage that no additional installation height is required.

Fine adjustment in the angle between the extension piece and said one link is achieved in one embodiment of the invention by providing a projecting portion on said one link and on the end of the projecting portion there is pivoted one end of an intermediate link extending parallel to the extension piece, the other end of said intermediate link being slidable in a guide slot formed in the extension piece which lies at an angle to the pivot axis of said one end of the intermediate link, a locking device being releasably engageable with the said other end of the intermediate link and with the extension piece.

The latter embodiment of the invention enables the angle of adjustment between the extension piece and said one link to be converted into a relatively large adjustment of said other end of the intermediate link so that it is possible to change the angle of adjustment in small steps without it being necessary for the holes on the locking device to be arranged so close together that the durability of the device would be impaired.

Said other end of the intermediate link may carry a roller engageable with a curved plate secured to the extension piece parallel to the slot, the curved plate having a plurality of holes in which a bolt is engageable backwards and forwards by means of a Bowden wire or the like, said bolt being mounted on said other end of the intermediate lever. In this embodiment said other end of the intermediate lever engages by means of a roller on the curved plate so that frictional forces are reduced and tilting within the guide slot is avoided.

Figure 2:
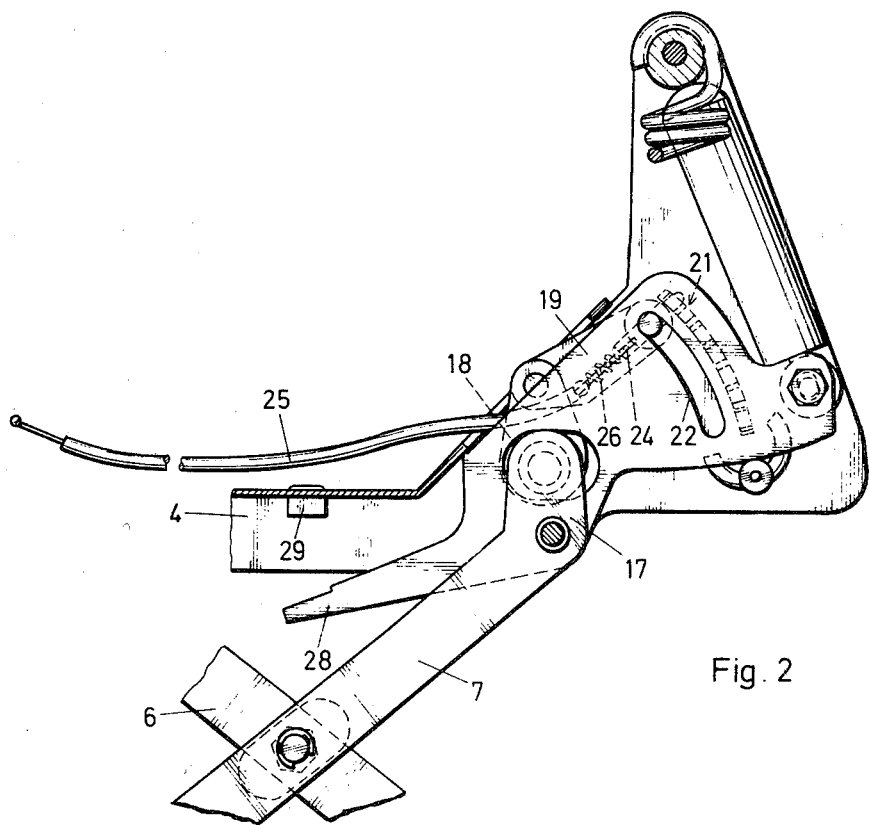
Figure 3:
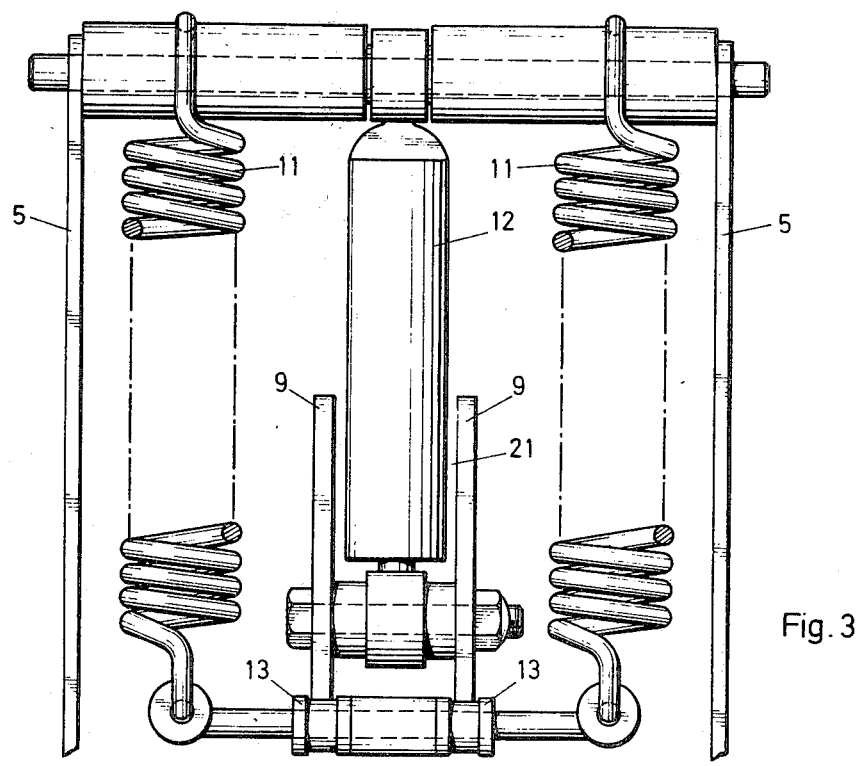

One embodiment of the invention is now described by way of example and with reference to the drawings, in which:

FIG. 1 is a side view of a device for height adjustment shown in a low setting position, FIG. 2 is a side view of the device of FIG. 1 shown in an upper setting position, and FIG. 3 is a view from the rear of the device of FIG. 1.

Referring to the drawings a vehicle seat has a seat frame 4 with upward-extended sides 5 in the region at the rear of the pelvis of an occupant. On the seat frame 4 there is arranged a seat cushion (not shown) and the back rest of the seat (not shown) extends approximately vertically upwards from the upward-extended sides 5.

The seat frame 4 is supported on an underframe (not shown), adapted to the vehicle construction, by means of a scissors linkage including links 6 and 7 arranged at each side of the seat, the links being connected at their points of intersection by means of pivot pins 8. The scissors links 7 are extended rearwards by extension pieces 9 beyond rear pivot pins 10 carried on the seat frame 4. On the extension pieces 9 there engages one end of a spring and damping unit comprising tension springs 11 and a shock absorber 12. While the shock absorber 12 is fixed relative to the outer end of the extension piece 9, the lower ends of the springs 11 are mounted in bearings to be movable along a guide edge 14 of the extension piece 9 by means of rollers 13. Movement of the rollers may, for example, take place by means of an adjusting rod, a Bowden wire or the like so as to alter the restoring moment imparted by the springs 11.

FIG. 3 shows the two extension pieces 9 at the sides of the shock absorber 12 which is centrally located. The extension pieces 9 are mounted to pivot in bearings on the pivot pin 10 common to both the links 7. In the neighbourhood of the shafts 10 the extension pieces have elongated holes 15 through which extend tubes 16 each rigidly welded at one end to a projecting portion 17 of the link 7 located at the outer side of the seat. The elongated holes 15 permit movement of the extension pieces 9 relative to the links 7.

At the centre of each tube 16 there is welded an additional sectional piece 18 of the projecting portion 17. At the end of the sectional piece 18 there is pivotally mounted one end of an intermediate lever 19 arranged parallel to the extension pieces 9.

At the other end of the intermediate lever 19 a roller 20 is mounted in bearings and engages a curved plate 21, the curved plate 21 being welded to the two extension pieces 9, a shaft 23 of the roller 20 being guided in a slot 22 formed in the curved plate 21.

At the said other end of the intermediate lever 19 there is also mounted a bolt 24 movable in bearings which can be pulled back against the force of a spring 26 by means of a Bowden wire 25. The bolt 24 engages in holes 27 in the curved plate 21 and thus holds the extension pieces 9 relative to the links 7.

FIG. 2 shows the height adjustment device in an upper setting position. The projecting portion 17 and the sectional pieces 18 are pivoted upwards so that the links 6 and 7 pivot upwards and the height of the seat frame 4 relative to the underframe is increased. Said other end of the intermediate lever 19 is pulled upwards in the guide slot 22 by the pivoting of the projecting portion 17. This can, of course, only take place if the stop bolt 24 has previously been pulled out of the holes in the curved plate 21 by means of the Bowden wire 25. When the desired seat height has been set the Bowden wire 25 is released and the spring 26 forces the stop bolt 24 back into one of the holes 27 in the curved plate 21.

Location of the seat at the desired height can be achieved by manual lifting or pressing down of the seat with the Bowden wire 25 tensioned. On the other hand, adjustment of the seat height may also be achieved by means of a spring which engages on the scissors linkage at a suitable point and which tends to push the seat upwards. In this case the occupant of the seat can locate the seat at the desired height by slight unloading or loading of his body weight on the seat with the Bowden wire tensioned.

It can be seen from FIGS. 1 and 2 that the extension piece 9 also has an extension 28 extending in the forward direction which serves, in conjunction with a rubber stop 29 carried on the seat frame 4, as a stop for the lower limit of the height adjustment device. The upper limit is provided by the stretched length of the shock absorber 12.

What we claim as our invention and desire to secure by Letters Patent of the United States is:

1. A resiliently-mounted vehicle seat, comprising a seat frame, a seat cushion carried by said seat frame, an underframe joined to said seat frame, a scissors linkage located at each side of said underframe and supporting said seat frame from said underframe, said scissors linkage including interconnected links, a pivot pin connecting the links of each scissors linkage at their points of intersection, at least one of the links of each scissors linkage having an extension piece joined thereto which extends beyond a pivot by which one link is pivotally attached to said seat frame, a spring and damping unit including tension springs and a shock absorber, said spring and damping unit being engageable with said extension piece and said extension piece being pivotal about the pivot for said one link when a load is applied to said seat frame, and means interconnected to said scissors linkage for locking said linkage in an adjusted position and for releasing said linkage for movement to an adjusted position for locating said seat frame in a desired position of use.

2. A vehicle seat according to claim 1, said one link including a projection portion that extends beyond the pivot for said one link, an intermediate lever extending parallel to said extension piece and having one of its ends pivotally attached to said projecting portion, the other end of said extension piece being slidable in a slot formed therein and which is angularly disposed relative to the pivot axis of said one end of said intermediate lever, said locking means including a loading device that is releasably engageable with said other end of the intermediate link and with said extension piece.

3. A vehicle seat according to claim 2, said other end of said intermediate lever including a roller that is engageable with a curved plate that is joined to said extension piece and that is located in parallel relation to said slot, said curved plate having a plurality of holes formed therein in which said loading device is selectively engageable for locating the scissors linkages in a desired position of use.

* * * * *